United States Patent [19]

McCloskey

[11] 3,843,215
[45] Oct. 22, 1974

[54] LINEAR BEARING

[75] Inventor: Albert R. McCloskey, Fairfield, Conn.

[73] Assignee: Rockwell International Corporation, Pittsburgh, Pa.

[22] Filed: Apr. 2, 1973

[21] Appl. No.: 347,079

[52] U.S. Cl. ............................................. 308/6 R
[51] Int. Cl. ............................................ F16c 31/06
[58] Field of Search ................................... 308/6 C

[56] References Cited
FOREIGN PATENTS OR APPLICATIONS

| 1,930,067 | 1/1970 | Germany | 308/6 |
| 1,931,983 | 1/1971 | Germany | 308/6 |

*Primary Examiner*—Charles J. Myhre
*Assistant Examiner*—Frank Susko

[57] ABSTRACT

An anti-friction ball bearing assembly adapted for mounting on a shaft comprising an outer sleeve and an inner sleeve concentrically fitting within said outer sleeve, said inner sleeve having a number of tracks defining paths for the circulation of balls between said sleeves and said shaft during relative longitudinal movement between said shaft and said bearing assembly, each of said tracks defining a closed loop path for said circulating balls, said balls being out of operational contact with said shaft during a portion of the circulation path and being in operational contact during another portion of said circulation path, the portion of said track defining the portion of that path during which said balls are in operational contact with said shaft being slightly skewed with respect to the longitudinal axis of said shaft.

7 Claims, 4 Drawing Figures

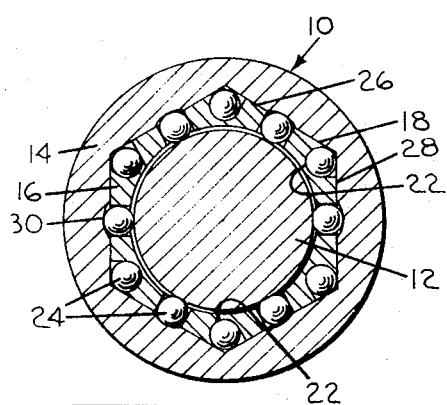
Fig.2
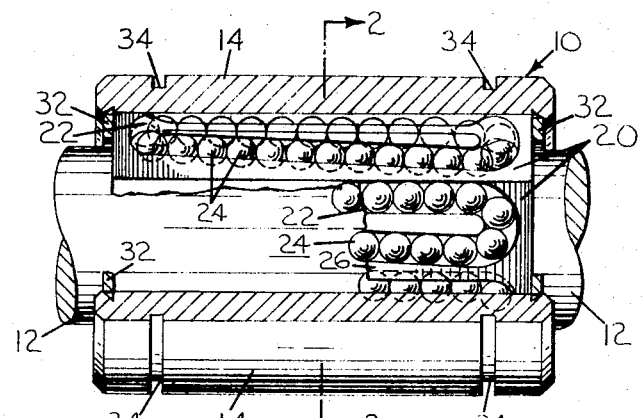
Fig.1
Fig.3
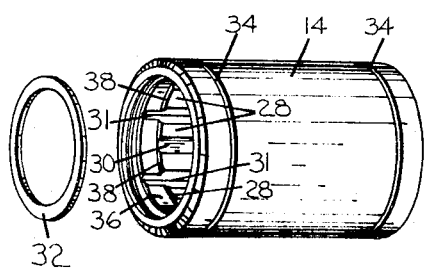
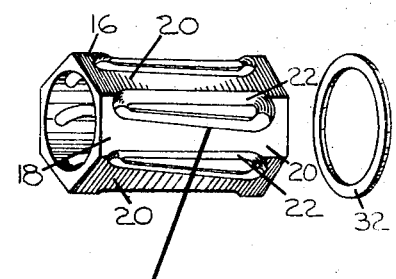
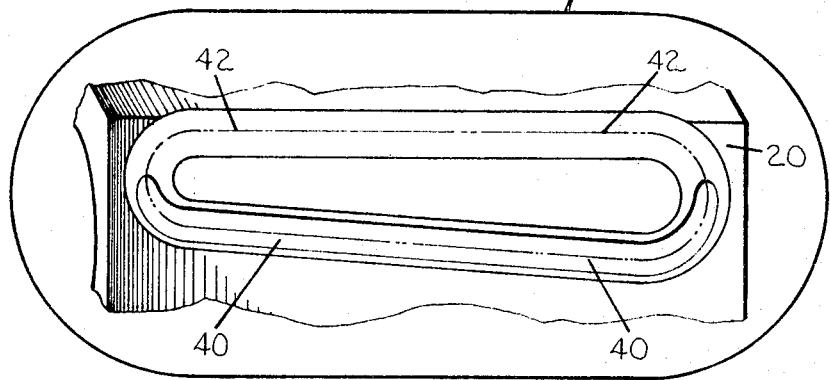
Fig.4

LINEAR BEARING

BACKGROUND OF THE INVENTION

This invention relates to a ball bearing assembly adapted to move longitudinally along the shaft.

This invention represents an improvement in ball bearing assembly disclosed in patent application Ser. No. 189,898 filed in the U.S. Pat. Office on Oct. 18, 1971 by Andrew Henn now U.S. Pat. No. 3,767,276.

In particular the invention relates to an anti-friction ball bearing assembly adapted for mounting on a shaft comprising an outer sleeve and an inner sleeve concentrically fitting within said outer sleeve, said inner sleeve having a number of tracks defining paths for the circulation of balls between said sleeves and said shaft during relative longitudinal movement between said shaft and said bearing assembly, each of said tracks defining a closed loop path for said circulating balls, said balls being out of operational contact with said shaft during a portion of the circulation path and being in operational contact during another portion of said circulation path, the portion of said track defining the portion of that path during which said balls are in operational contact with said shaft being slightly skewed with respect to the longitudinal axis of said shaft.

The prior art is replete with various forms of recirculating ball bearing assemblies. The major thrust of the prior art is to provide a recirculating ball bearing assembly which has superior wear characteristics over a substantial period of time. In attempting to achieve this high performance goal the prior art failed to take into consideration the "other" working element of the bearing assembly, that is, the shaft. Accordingly, certain advances where achieved in the bearing assemblies without any comparable increase in the longevity of the shaft life. In fact in certain instances the shafts were prematurely scored or otherwise damaged by the operational engagement of the recirculating ball bearing on the shaft.

Replacement of the shaft which is typically integral with a machine element or apparatus, requires substantial downtime of the associated machine. This involves lost machine time and costly maintenance.

One primary cause of shaft scoring is due to the limited shaft curve exposed to the recirculating balls. The recirculating balls are typically maintained in a fixed positional relationship with the shaft thereby tending to score a line in the peripheral surface of the shaft.

As the shafts become scored in hertzian stress increases due to fatigue loading resulting ultimately in the failure of the shaft and binding of the bearing thereon.

SUMMARY OF THE INVENTION

Accordingly, it is an object of the present invention to provide an anti-friction ball bearing assembly adapted for mounting on a shaft comprising an outer sleeve and an inner sleeve concentrically fitting within said outer sleeve, said inner sleeve having a number of tracks defining paths for the circulation of balls between said sleeves and said shaft during relative longitudinal movement between said shaft and said bearing assembly, each of said tracks defining a closed loop path for said circulating balls, said balls being out of operational contact with said shaft during a portion of the circulation path and being in operational contact during another portion of said circulation path, the portion of said track defining the portion of that path during which said balls are in operational contact with said shaft being slightly skewed with respect to the longitudinal axis of said shaft.

It is another object of the present invention to provide an antifriction ball bearing assembly in which the track is elongated in shape having two straight portions being slightly angularly disposed one with respect to the other.

It is yet another object of the present invention to provide an anti-friction ball bearing assembly in which the shaft is a circular shaft.

It is still another object of the present invention to provide an anti-friction ball bearing assembly in which the inner sleeve is an integral body.

It is another object of the present invention to provide an anti-friction ball bearing assembly in which the inner sleeve is formed from a plurality of segments, said segments being mechanically interlocked one to another.

It is yet another object of the present invention to provide an anti-friction ball bearing assembly in which the straight portion of said circulation path during which said balls are out of operational contact with said shaft is in longitudinal alignment with the axis of said shaft.

It is still another object of the present invention to provide an anti-friction ball bearing assembly in which the inner surface of said outer sleeve provides a raceway surface for said balls while they are in operational contact with said shaft.

It is another object of the present invention to provide a highly efficient ball bearing assembly capable of being inexpensively manufactured and being simplistic in design.

Another object of the present invention is to provide an improved anti-friction ball bearing assembly having superior load carrying characteristics.

It is still another object of the present invention to provide an anti-friction ball bearing assembly which can be manufactured using automated high volume techniques.

It is yet another object of the present invention to provide a recirculating anti-friction ball bearing assembly in which the operational or loaded portion of the track is skewed with respect to the longitudinal axis of the shaft thereby distributing the wear over a substantially large area of the shaft surface.

It is still another important object of the present invention to provide a recirculating anti-friction ball bearing assembly in which the skewing of a portion of the track distributes the fatigue loading on the shaft thereby reducing the attendant hertzian stresses therein.

Other objects and advantages of the invention will become apparent as the present invention is better understood from the following disclosure and as shown in the accompanying drawings.

DESCRIPTION OF THE DRAWINGS

The accompanying drawings, referred to herein and constituting a part hereof, illustrate an embodiment of the invention, and together with the description, serve to explain the principles of the invention.

In the drawings:

FIG. 1 is a side elevational view, partially cut away, of an anti-friction ball bearing assembly mounted on a shaft embodying the concept of the present invention;

FIG. 2 is a sectional view taking along line 2—2 of FIG. 1;

FIG. 3 is an exploded perspective view of the anti-friction ball bearing assembly of FIG. 1;

FIG. 4 is an enlarged fragmentary perspective view of a portion of the inner sleeve of the anti-friction ball bearing assembly of FIG. 3.

DESCRIPTION OF THE INVENTION

Referring now to the drawings, there is shown an improved anti-friction ball bearing asembly embodying the concept of the present invention wherein the anti-friction ball bearing assembly is generally designated by the numeral 10.

The anti-friction ball bearing assembly is particularly adapted for being mounted, for linear translation, on a shaft 12. The anti-friction ball bearing assembly 10 is provided with an outer sleeve 14 and an inner sleeve 16. The inner sleeve 16 is concentrically interfitted within the outer sleeve 14. The outer surface 18 of the inner sleeve 16 may be essentially polyhedronal in shape having a number of axially extending planar surfaces 20. The inner sleeve 16 is further provided with a number of tracks 22 which define paths for the circulation of the balls 24. The inner surface 26 of the outer sleeve 14 may be similarly substantially polyhedronal in shape. The shape of the inner surface 26 of the outer sleeve 14 generally conforms to the shape of the outer surface 18 of the inner sleeve 16. The inner surface 26 of the outer sleeve 14 has a number of axially extending planar surfaces 28. The outer surface 18 of the inner sleeve 16 is in registration with the inner surface 26 of the outer sleeve 14 at their respective axial extending planar surface 26 of the outer sleeve 14 at their respective axial extending planar surfaces 20 and 28.

Each of the axially extending planar surfaces 28 may be provided with axially extending arcuately shaped bearing raceways 30. The axially extending raceways 30 may be located intermediate the lines 31 described by the intersection of the various planar surfaces 28 of the outer sleeve 14.

Retaining means such as snap rings 32 are provided at each end of the anti-friction ball bearing assembly 10 to positionally anchor the inner sleeve 16 into outer sleeve 14 to thereby maintain the operational integrity of the anti-friction ball bearing assembly 10. The snap rings 32 therefore maiantain the axial position of the inner sleeve 16 with respect to the outer sleeve 14 while the aforementioned registration of the axial extending planar surfaces 20 and 28 maintain the radial position of the inner sleeve 16 with respect to the outer sleeve 14.

The outer sleeve 14 may be substantially cylindrical in shape and may be provided with annular grooves 34. The grooves 34 may be adapted to receive retaining means such as snap rings (not shown), to positionally anchor or attach the anti-friction ball bearing assembly 10 within or to a bushing or housing member (also not shown).

The planar surfaces 28 may terminate at each end in a concave end surface 36. These concave end surfaces 36 are recessed with respect to the axially extending planar surfaces 26 of the outer sleeve 14 and arcuately shaped raceways 30. A smooth transition is provided between the arcuately shaped raceways 30 and concave end surface 36 by means such as tapered sleeves 38.

As can be seen from the above, the anti-friction ball bearing assembly 10 can be generally described as a linear (circulating) ball bearing. In particular, the anti-friction ball bearing assembly 10 essentially provides linearly moving bearing support between some member such as the above noted bushing (not shown) and shaft 12. As the anti-friction bearing assembly 10 moves along the shaft 12, the balls 24 will tend to roll and circulate in and through the tracks 22 in the inner sleeve 16. As can best be seen in FIGS. 1 and 2, the balls 24 assume two basic positions, an active or loaded position or an inactive or unloaded position. In the active position, the balls 24 will provide rolling support between the outer sleeve 14 (and in turn the bushing or other member to which it is attached) and the shaft 12, as the shaft 12 and anti-friction ball bearing assembly 10 (and bushing) move with respect to each other. In the inactive position, the balls 24 are in effect doing no useful work but are being recirculated to their active position. The balls 24, when in their inactive position, are not therefore in contact with the shaft 12.

The balls, of course, will circulate in a direction depending upon the relative motion of the anti-friction ball bearing assembly 10 with respect to the shaft 12. Essentially, the balls 24 will circulate or track in the same direction as the movement of the outer sleeve 14. The balls 24 track from their active to inactive position and will be disengaged from the shaft at the time they encounter the tapered sleeves 38. This occurs before the balls 24 reach the curved portion of the tracks 22.

At this juncture of the description of the invention reference should be made to FIG. 3 and FIG. 4 to best understand the thrust of the present invention.

In particular, as can be best seen in FIG. 4, the straight portions of the closed loop track 22 are not parallel. In fact, the portion of the track 40 in which the balls 24 are in their active state, i.e., operationally contacting the shaft 12 and the bearing raceways 30 is angularly disposed to the longitudinal axis of the shaft 12. Further the above portion 40 of the track 22 is angularly disposed with respect to the straight portion 42 of the track 22 in the balls 24 are in their inactive state.

It can be seen therefore, that as the balls 24 circulate in their closed loop path defined by the track 22 the balls 24, when in their active state, encounter an area of the shaft rather than a straight line segment of the shaft. This directly results in the reduction of the scoring of the shaft. Additionally and most importantly the fatigue stress encountered during operation is distributed throughout an area of the shaft 12 thereby reducing the hertzian stresses.

The "skewing effect" therefore results in a high performance recirculating anti-friction ball bearing assembly offering long life to the bearing itself and its associated shaft.

The various components of the anti-friction ball bearing assembly 10 could be manufactured from a wide range of materials utilizing a number of fully automated techniques. For example, the outer sleeve 14 could be manufactured from steel such as SAE 5200 steel. Additionally, the sleeve could be suitably coated and/or treated depending upon application and environment.

As mentioned before, the inner sleeves 16 are effectively isolated from all loads. Accordingly, the inner sleeve 16 could be manufactured from an even wider range of materials such as zinc alloys, plastics as well as other moldable materials. Obviously, the balls and/or the various bearing raceways 30 could be coated with a suitable self-lubricating plastic such as polytetrafluouroethylene.

Both the inner sleeve 16 and the outer sleeve 14 could be manufactured using high volume manufacturing techniques. In particular, the design of the outer sleeve 14 renders it particularly adaptable to broaching. The inner surface 26 of the outer sleeve 24 comprising both the axially extending planar surfaces 28 and the bearing raceways 30 could be broached by utilizing a pull or push broach. Preferably, a pull broach would be utilized for such a broach would be less apt to bind during the cutting operation of the inner surface 28. Other suitable machining and/or molding operations could likewise be utilized to manufacture and fabricate the inner sleeve.

Assembly of the overall anti-friction ball bearing assembly 10 in a like manner could be accomplished by using advanced automated techniques.

Obviously, the present invention is not limited to the specific details as herein described, but is capable of other modifications and changes without departing from the spirit and scope of the appended claims.

I claim:

1. An anti-friction ball bearing assembly comprising an outer sleeve and an inner sleeve concentrically fitting within said outer sleeve, said inner sleeve having a central opening for the passage of a shaft therethrough, balls, the inner sleeve having a number of tracks defining paths for the circulation of said balls between said sleeves and said shaft during relative movement between said shaft and said bearing assembly, the outer surface of the inner sleeve being polyhedronal in shape, the inner surface of the outer sleeve being provided with a number of guideways, the intersections of the plane portions defining the outer surface of the inner sleeve registering with said guideways, said inner surface of the outer sleeve is further provided with a number of substantially concave bearing surfaces aligned with said tracks such that they provide a rolling bearing surface for said balls while said balls are in their loaded state, the portion of that path during which said balls are in their loaded state being slightly skewed with respect to the longitudinal axis of said bearing assembly.

2. An anti-friction ball bearing assembly in accordance with claim 1 wherein said track is elongated in shape having two straight portions being slightly angularly disposed one with respect to the other.

3. An anti-friction ball bearing assembly in accordance with claim 2 wherein said shaft is a circular shaft.

4. An anti-friction ball bearing assembly in accordance with claim 1 wherein said inner sleeve is an integral body.

5. An anti-friction ball bearing assembly in accordance with claim 1 wherein said inner sleeve is formed from a plurality of segments, said segments being mechanically interlocked one to another.

6. An anti-friction ball bearing assembly in accordanace with claim 2 wherein said straight portion of said circulation path during which said balls are out of operational contact with said shaft is in longitudinal alignment with the axis of said shaft.

7. An anti-friction ball bearing assembly in accordance with claim 2 wherein the inner surface of said outer sleeve provides a raceway surface for said balls while they are in operational contact with said shaft.

* * * * *